Aug. 24, 1965 A. J. GIGER 3,202,941

HIGH FREQUENCY CHANNEL SWITCHING UNIT EMPLOYING ELECTROMECHANICAL CONTACT MEANS

Filed Dec. 23, 1960

2 Sheets-Sheet 1

INVENTOR
A. J. GIGER
BY [signature]
ATTORNEY

INVENTOR
A. J. GIGER
BY [signature]
ATTORNEY

United States Patent Office 3,202,941
Patented Aug. 24, 1965

3,202,941
HIGH FREQUENCY CHANNEL SWITCHING UNIT, EMPLOYING ELECTROMECHANICAL CONTACT MEANS

Adolf J. Giger, Springfield, N.J., assignor to Bell Telephone Laboratories, Incorporated, New York, N.Y., a corporation of New York Filed Dec. 23, 1960, Ser. No. 78,036
3 Claims. (Cl. 333—7)

This invention relates to high frequency switching units. More particularly, it relates to means for selectively interconnecting a first high frequency communication channel and any of several others.

It is common knowledge that equipment which operates satisfactorily in the low frequency range often becomes entirely inoperative when acting upon signals of high frequency in the range of, for example, 10 megacycles. In this range, coils which are otherwise inductances may become capacitances; open contacts become capacitive reactances; power loss arises due to the interconnection of equipment having incorrect impedance for optimum power transfer; and cross-coupling develops due to the inductive and capacitive effects between adjacent wires and equipment.

In order to operate under these conditions, numerous techniques have been developed. It is common practice to use balanced lines, coaxial cabling, and special connecting equipment and wire layouts to reduce the disturbing effects of high frequency operation. Often, compensating elements or impedance transformers are used. These techniques result in the use of expensive and critical components which take up considerably more space than the simple low frequency equipment used for performing essentially similar functions.

A typical communication system in which the problems of high frequency operation are encountered is disclosed in the patent application of F. S. Farkas, Serial No. 344, filed January 4, 1960, issued as Patent No. 3,111,624 on November 19, 1963, and assigned to the assignee hereof. The system therein disclosed contains a plurality of regular transmission channels operative to carry communication signals between distant points. In the event one of these regular channels fails, the signal being transmitted thereover is also applied to a standby protection channel. Following failure, the receiver is switched to the protection channel. A system of this nature requires matched impedances in order to operate efficiently. It also requires a plurality of switching contacts or circuits in order to permit switching a receiver between various incoming channels. To accomplish this by the use of conventional high frequency switches with coaxial coupling and impedance matching transformers would require considerable space and expense.

An object of the present invention is to provide a multicontact switching unit that is efficient and reliable for switching operations involving signals in the high frequency range.

Another object of the invention is to provide a multicontact switching unit operative to switch a receiving terminal from one active channel to another, both of which are carrying high frequency signals, with a minimum of disturbance to the signals being received.

Wire spring relays are capable of performing the required functions at low frequency but at high frequencies such as those contemplated, the springs and contacts constitute intolerable impedance discontinuities in the system. Nevertheless, the ready availability, reasonable cost, and desirable multicontact features make use of such relays as a component of a high frequency switching unit highly desirable.

A feature of the invention resides in the employment of electromechanical relays of the wire spring type as a component of a high frequency switch unit.

Another feature relates to the use of short transmission lines having a particular characteristic impedance with respect to the transmission channels of the system, as an integral part of a switching unit.

Still further features reside in the use of contact sequencing to avoid switching transients, and capacitive contact bridging to reduce crosstalk between regular and protection channels.

In general, the invention is embodied in a switching unit comprising electromechanical relays, unique transmission line wiring between relay contacts, and control circuitry to enable the switching unit to transfer a receiver from one channel to another with minimum disturbance to the signal being received. The switching contacts of the electromechanical relay are bridged by neutralizing capacitors to reduce crosstalk between the channels arising due to the capacitive effect of such contacts. Selected circuit paths between various transfer contacts and between channels and the signal source are wired with short pieces of transmission line having a selected characteristic impedance determined by the capacitive effect of the relay contacts connected thereto and the characteristic impedance of the interconnected channels. Two independent relays are employed to increase isolation between active transmission channels, and a transistor control circuit provides sequential switching to insure continuity of transmission and avoid transients or "hits" on the channels.

The above objects and features, in addition to others, will be more clearly understood and appreciated following consideration of the illustrative embodiment shown in the drawing wherein.

Figure 1:
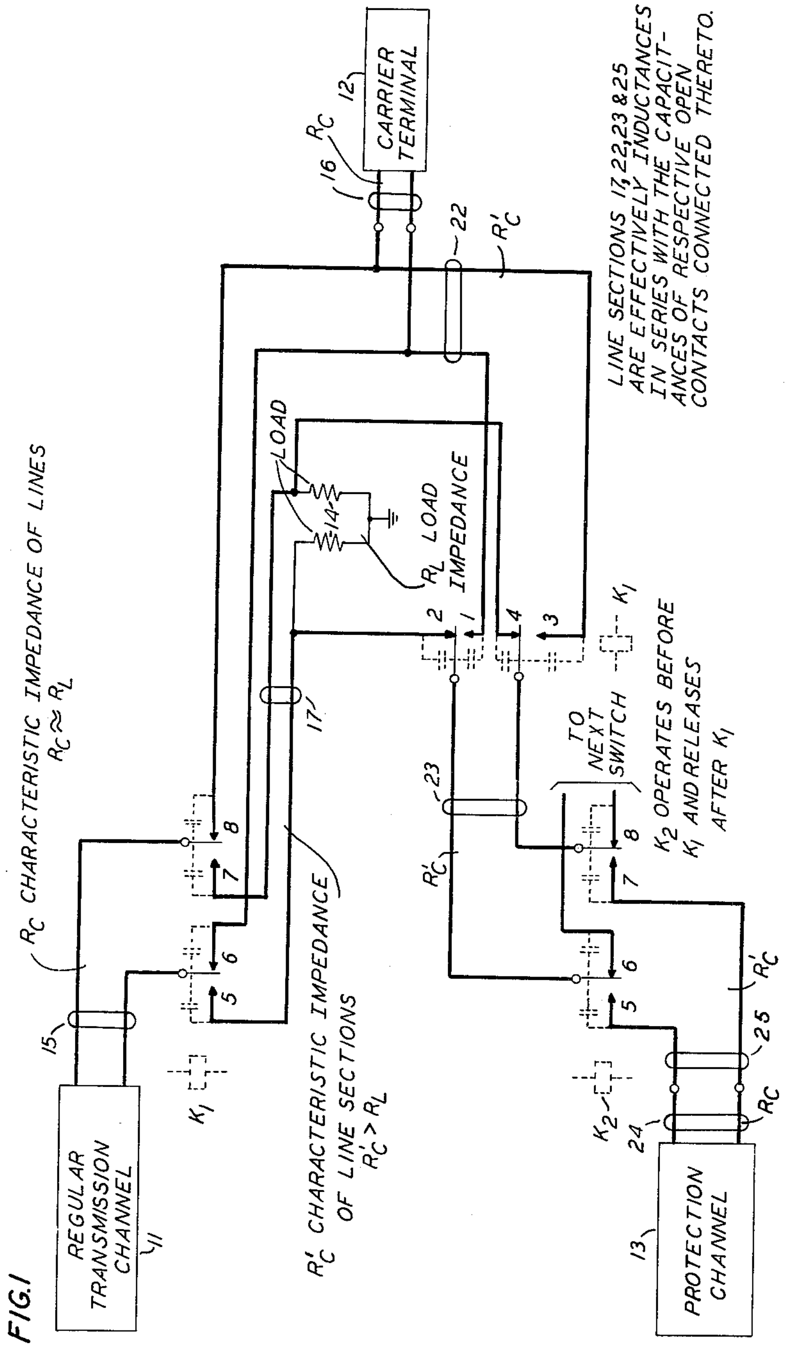
FIG. 1 is a schematic diagram of a basic embodiment of the invention including the short pieces of transmission line but omitting the neutralizing capacitors.

In the basic embodiment of FIG. 1, a regular transmission channel 11 is connected through a transmission line 15, the normally closed contacts 6 and 8, and the transmission line 16 to a carrier terminal 12, so that signals may flow from regular channel 11 to terminal 12. In the event that signals arriving on regular channel 11 fall below a predetermined standard, relay K2, shown dotted, is operated in a manner explained hereinafter to connect a protection channel 13 through transmission line 24, transmission line section 25, the operated contacts 5 and 7, transmission line section 23 and normally closed contacts 2 and 4 to a load impedance 14. Shortly thereafter, relay K1, shown dotted at two places in FIG. 1, is operated as explained hereinafter to connect the protection channel 13 from line section 23 through its operated contacts 1 and 3, the transmission line section 22 and the transmission line 16 to the carrier terminal 12. At the same time, relay K1 operates its contacts 5 and 7 to connect the regular transmission channel 11 from transmission line 15 through transmission line section 17 to the load impedance 14. Protection channel 13 is now available to supply signals to carrier terminal 12 and regular channel 11 is disconnected from carrier terminal 12.

Each pair of switch contacts shown in FIG. 1 has an inherent capacitance therebetween in the open condition. This capacitance between the contacts is conventionally referred to as the capacitance of the contacts, or simply the contact capacitance. The characteristic impedances, each designated $R_C$ in FIG. 1, of transmission lines 15, 16 and 24 are all equal to each other and to the impedance $R_L$ of the load impedance 14.

As explained in connection with Equations 4–7 hereinafter, the characteristic impedances, each designated $R_C'$ in FIG. 1, of transmission line sections 17, 22, 23, and 25 are all greater than $R_L$ or $R_C$ in order to provide an effective inductance in series with the capacitances of the respective open contacts connected thereto. The combination of inductance and capacitance, for example, the effective inductance of line section 17 and the capacitances across the normally open contacts 5 and 7 of relay K1, forms a low pass filter across a respective circuit through a pair of closed contacts, for example, across the circuit through the closed contacts 6 and 8 of relay K1 between regular channel 11 and carrier terminal 12. Because it includes the effective inductance of line section 17, this low pass filter will permit transmission of higher frequencies through closed contacts 6 and 8 of relay K1 to carrier terminal 12 at a prescribed return loss requirement than if the effective inductance of line section 17 were absent. It therefore can be said that a compensating inductance has been cascaded with the capacitances across open switch contacts 5 and 7.

Figures 2, 3:
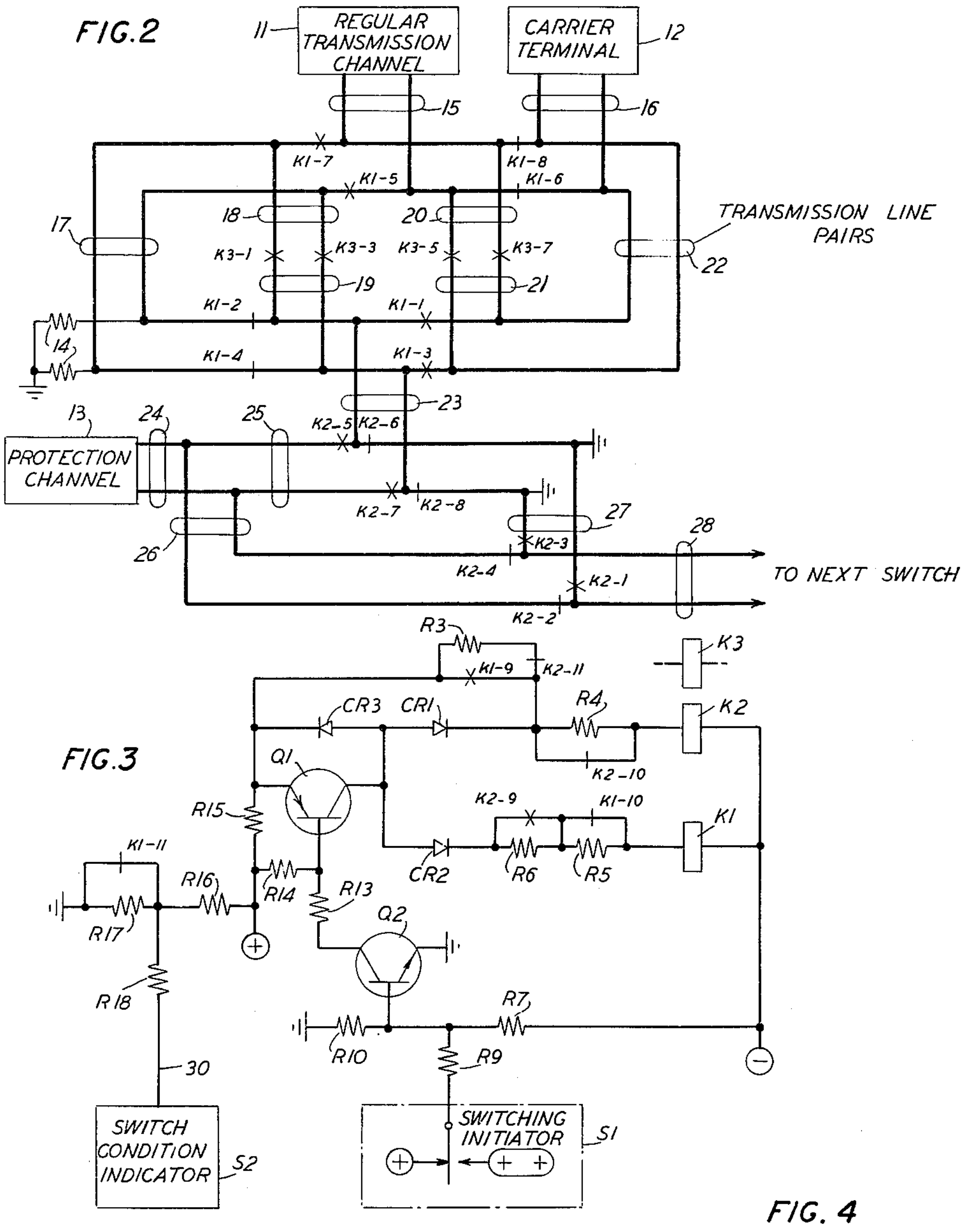
FIG. 2 is a detached contact schematic of the contact wiring of the preferred illustrative embodiment including the neutralizing capacitors.
FIG. 3 is a circuit schematic of the transistorized switching sequence control circuit of the preferred illustrative embodiment.
Figure 4:
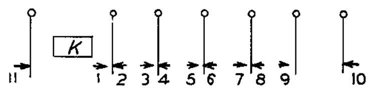
FIG. 4 is a conventional representation of the type of relay contemplated in the preferred illustrated embodiment.

The detached contact convention has been adopted in FIGS. 2 and 3 in order to better illustrate the wiring used in the circuits employed. In accordance with this convention, each contact is located at a position in the circuit schematic where its function is most pertinent. The contacts are illustrated by either a line perpendicular to the lead or an "X" intersecting the lead to which they are connected. The former symbol designates normally closed contacts and the latter normally open contacts. Each contact is identified by an indicator comprising the relay designation followed by a contact number. Specifically, the arrangement of each contact with respect to a general relay "K" is shown in FIG. 4. All transfer contacts employed herein are of the "continuity" or early make-break variety. This arrangement insures closure of a new circuit path before disconnection of a former one. In further explanation of the drawing, it may be noted that the loops surrounding pairs of leads in FIG. 2 are indicative of the fact that the pairs comprise a transmission line having a particular characteristic impedance.

The operation to be performed by the illustrative switching unit is the transfer of a carrier terminal or receiving point from a regular transmission channel to a protection channel or vice versa. As shown in FIG. 2, under normal conditions Regular Transmission Channel 11 is connected to Carrier Terminal 12. In the event signals arriving on Regular Transmission Channel 11 fall below a predetermined standard, Protection Channel 13 is connected to Carrier Terminal 12, and Regular Transmission Channel 11 is disconnected.

For purposes of the following discussion, each of the contacts appearing in FIG. 2 may be considered as a capacitor at the signal frequency contemplated. Experience shows that the capacitance of these contacts is approximately the same for all relays of the same type. Examination will reveal that contacts K1–8, K3–5, K1–6 and K3–7 are connected in a bridge whereby the capacitances of contacts K3–5 and K3–7 act as neutralizing capacitors to reduce crosstalk between Regular Channel 11 and Protection Channel 13, under the condition of Protection Channel 13 feeding Carrier Terminal 12. A similar neutralizing bridge is created by the interconnection of contacts K1–4, K3–3, K1–2, and K3–1. To insure correct capacitive values, the open contacts of a relay identical to functioning relay K–1 are used. These contacts are furnished by relay K3, which does not have its winding connected to the circuit, and consequently, at no time are the contacts thereof actuated.

Four distinct circuit paths are utilized in the illustrated switching unit. In each of these paths a plurality of open contacts contribute to the over-all capacitive reactance experienced by high frequency signals. The contacts involved are:

(I) Circuit path from Regular Transmission Channel 11 to Carrier Terminal 12. Contacts K3–5, K3–7, and K1–7, K1–5, and K1–1, K1–3.

(II) Circuit path from Regular Transmission Channel 11 to Dummy Load 14. Contacts K1–6, K1–8, and K3–5, K3–7, and K3–1, K3–3, and K1–2, K1–4.

(III) Circuit path from Protection Channel 13 to Carrier Terminal 12. Contacts K2–6, K2–8, and K2–2, K2–4, and K3–1, K3–3, and K1–2, K1–4, and K3–5, K3–7, and K1–8, K1–6.

(IV) Circuit path from Protection Channel 13 to the next switch. Contacts K2–5, K2–7, and K2–1, K2–3. Obviously, each of these circuit paths is predominantly capacitive at high frequencies.

To yield a switching unit of operating effectiveness, a return loss requirement of not less than 40 db will be assumed, irrespective of which of the above traced circuit paths are involved in any particular switch condition. Also, to furnish illustrative figures, it will be assumed that 124 ohm balanced cable is used for the switching unit input and output. This established loss requirement furnishes an indication of the maximum permissible impedance deviation between the assumed 124 ohms and the impedance of the switching unit.

$$\text{Return loss} = 20 \log \frac{1}{\rho} \quad (1)$$

where $\rho$ represents the reflection coefficient. Consequently, the desired reflection coefficient for a 40 db return loss is equal to 0.01.

It is known that $$\rho = \frac{R_L - R_C}{R_L + R_C} \quad (2)$$

Where $R_L$ equals the load resistance, and $R_C$ equals the characteristic impedance of the transmission line. For the case where $R_L \approx R_C$, Equation 2 reduces to $$\rho = \frac{\Delta R}{2R_C} \quad (3)$$

Solution of this equation indicates that the impedance deviation $\Delta R$ equals 2.48 ohms.

As is well known, $R_C$ is approximately equal to $\sqrt{L/C}$ for low loss transmission lines where L and C represent the series inductance and shunt capacitance respectively, per unit length of line. The capacitive discontinuities produced by the open contacts of a simple electromechanical relay, as described above, create an impedance deviation far in excess of the permissible value of 2.48 ohms. Because the $L/C$ ratio is impaired at the switch by the increased capacitance due thereto, the addition of a proper amount of series inductance will result in establishment of a balance. The cascading of capacitive discontinuities and compensating inductances results in a low-pass filter structure. This structure can be matched to the load impedance of 124 ohms by selectively choosing the value of the inductances. The method described herein is effective when the cut-off frequency of the low-pass filter structure is higher than the highest transmitted frequency. Generally, this cut-off frequency is much higher than 10 megacycles.

Figure 5:
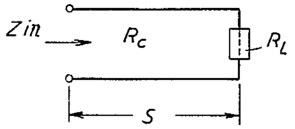
FIG. 5 is a schematic of a typical transmission line terminated in a load impedance.

The employment of short transmission lines to effect the required balance will be understood from an analysis of the input impedance relationships of a lossless line such as illustrated in FIG. 5. The input impedance of such a line may be represented as, $$Z_{in}=R_C\left[\frac{R_L+jR_C \tan \beta S}{R_C+jR_L \tan \beta S}\right] \quad (4)$$

Where $\beta$ equals the phase constant of the line and S equals the length of the line. For purposes of simplification, let $R_L$ equal $KR_C$. Recognizing that for small lengths of line tan $\beta S$ is approximately equal to $\beta S$, Equation 4 reduces to $$Z_{in}+R_C\left[\frac{K+j\beta S}{1+jK\beta S}\right] \quad (5)$$

Since $jK\beta S$ ie small, we may make use of the relationship $$\frac{1}{1+jK\beta S}\approx 1-jK\beta S$$

and simplify further to obtain $$Z_{in}=R_C[K+j\beta S(1-K^2)] \quad (6)$$

or $$Z_{in}=R_L+j\beta SR_C(1-K^2) \quad (7)$$

From Equation 7 is it evident that by choosing K less than one, the reactive component of the input impedance will be inductive while the rear component remains at $R_L$.

In other words, a short piece of transmission line having a characteristic impedance greater than the load impedance will effectively yield the means for inductive balancing, the extent of which will be determined by the length of the line. Each circuit path containing open contacts therein may, therefore, be matched to the input and output of the switching unit by employing short pieces of transmission line having characteristic impedance greater than that of the input or output and having a length determined by the particular inductive effect required by the circuit path.

Accordingly, FIG. 2 shows transmission line pair 22 interconnecting contacts 1, 3, 6 and 8 of relay K1. Likewise, transmission line pair 17 interconnects contacts 2, 4, 5 and 7 of relay K1. Transmission line pair 18 connects contacts 1 and 3 of relay K3 to contacts 5 and 7 of relay K1, and transmission line pair 19 connects contacts 1 and 3 of relay K3 to contacts 2 and 4 of relay K1. Similarly transmission line pair 20 connects contacts 5 and 7 of relay K3 to contacts 6 and 8, respectively, of relay K1, and the transmission line pair 21 connects contacts 5 and 7 of relay K3 to contacts 1 and 3, respectively, of relay K1. Moreover, as indicated hereinbelow, transmission line pairs 23, 24, 25, 26, 27 and 28 connect the contacts associated with these transmission lines to protection channel 13. Channel 11 and terminal 12 are connected to the switching unit by transmission line pairs 15 and 16, respectively.

If, for reasons of relay geometry and/or due to a low value of load impedance, the relay appears inductive, essentially the same method as described above can be used to compensate for the excess inductance. In this case, the short transmission lines would have characteristic impedances smaller than the load impedance thereby yielding capacitive balancing of the circuit.

As a further improvement, the illustrated high frequency switching unit provides means for reducing switching transients or "hits." By properly sequencing the operation of the contacts of relays K1 and K2, it is possible to transfer Carrier Terminal 12 from the Regular Channel 11 to the Protection Channel 13 with a minimum of transient. This sequencing is controlled by the circuit illustrated in FIG. 3.

The control circuit comprises two transistors, Q1 and Q2, the windings of relays K1 and K2, a typical Switching Initiator S1, and interconnecting elements and circuitry. Switching Initiator S1 is merely a symbolic representation. In fact, it may be an automatic switch operable under predetermined conditions to apply particular voltages to the control circuit.

Under normal conditions Regular Transmission Channel 11 is connected to Carrier Terminal 12 and relays K1 and K2 are in a nonoperated condition. At this time, Switching Initiator S1 has its armature connected to either ground, or to a slightly positive voltage, illustrated as (+). This voltage condition biases transistor Q2 in a nonconducting state and in consequence thereof, transistor Q1 is similarly nonconducting because of the bias voltage applied through resistors R14 and R15. With transistor Q1 nonconducting, the operating path of relay K1 is open. Relay K2, however, has an energizing circuit comprising negative potential, the winding thereof, normally closed contacts K2–10 and K2–11, resistors R3 and R15, and positive potential. The values of resistors R3 and R15 are chosen to limit the current sufficiently to prevent the operation of relay K2 at this time.

Switching of the Carrier Terminal 12 from Regular Transmission Channel 11 to Protection Channel 13 is initiated by connecting the armature of switching Iniatiator S1 to a sufficiently high positive voltage, illustrated as (++), to forward-bias transistor Q2 and drive it into saturation. With transistor Q2 saturated, its collector potential is substantially that of the emitter, or ground. This ground reduces the potential on the base of transistor Q1 through the voltage divider comprising resistors R14 and R13. The emitter-base potential on transistor Q1 now favors heavy conduction and this occurs. The conduction of transistor Q1 provides low impedance energization circuits for relays K1 and K2.

The first relay to be operated is relay K2. This is due to the fact that it is initially conducting current as heretofore described. Its operating circuit comprises negative potential, the winding thereof, normally closed contacts K2–10, diode CR1, the collector and emitter of transistor Q1, resistor R15, and positive potential. Once operated, relay K2 opens contacts K2–10 thereby limiting its holding current by the insertion of resistor R4. Operation of relay K2 also removes resistor R6 from the energization circuit of relay K1 by closing shunting contacts K2–9. With resistor R6 effectively short-circuited, relay K1 is rapidly energized in the circuit comprising negative potential, the winding thereof, closed contacts K1–10 and K2–9, diode CR2, collector and emitter electrodes of transistor Q1, resistor R15, and positive potential. Operation of relay K1 places current limiting resistor R5 in its energizing path by opening contacts K1–10 and also furnishes a holding circuit for relay K2 at contacts K1–9 by shunting diode CR1 and transistor Q1.

Reference to FIG. 2 will clarify the effect of the sequential operation of relays K2 and K1. Initially, Regular Transmission Channel 11 is connected to Carrier Terminal 12 via transmission pair 15, normally closed contacts K1–8 and K1–6, and transmission pair 16. Upon operation of relay K2, Protection Channel 13 is connected to a load 14 via transmission pairs 24, 25, and 23, contacts K2–5, K2–7 and contacts K1–2, K1–4. Load 14 is selected to be equal to the characteristic impedance of the input and output transmission lines. At the same time Protection Channel 13 is severed by contacts K2–4 and K2–2 from transmission pair 28 which leads to the next switch. Subsequently, when relay K1 operates, contacts K1–1 and K1–3 connect Protection Channel 13 to the Carrier Terminal 12 via transmission pairs 22 and 16. At this time contacts K1–7 and K1–5 connect Regular Transmission Channel 11 to load 14. Because continuity contacts are employed, contacts K1–8 and K1–6 do not open until contacts K1–7 and K1–5 have closed, and contacts K1–2 and K1–4 do not open until contacts K1–1 and K1–3 have closed. Thus, at the time of switching, transients are at a minimum.

It will be noted that provision is made for the connection to a "Next Switch." This provision enables the use of additional Regular Channels serviced by the same Protection Channel. The additional circuitry required to furnish this facility is substantially identical to that illustrated in FIG. 2.

Removal of Protection Channel 13 from Carrier Terminal 12 and reinstatement of Regular Transmission Channel 11 is initiated by connecting the armature of Switching Initiator S1 to the smaller positive potential, (+). This removes the forward bias on transistor Q2 and causes it to stop conducting. Once transistor Q2 ceases conduction, the ground no longer appears on its collector and consequently the forward bias on transistor Q1 is removed and it, too, becomes nonconducting. The resulting decrease in current through the windings of relays K1 and K2 develops a back voltage which diode CR3 bypasses in order to protect transistor Q1. Relay K1 is the first to become de-energized because its holding path includes the collector and emitter of transistor Q1 whereas relay K2 remains operated as long as relay K1 is operated due to the condition of contacts K1–9. Release of relay K1 causes opening of contacts K1–9 and relay K2 releases. The circuit thus assumes its original condition.

The return of the control circuit to the original condition is accompanied by a return of Carrier Terminal 12 to Regular Transmission Channel 11 in a fashion which is the reverse of the previously-described sequence.

Switch Condition Indicator S2 is provided to indicate the condition of the transmission path. It is merely a voltage divider with one section shunted to ground when the regular channel is connected to the carrier terminal. As shown, when relay K1 is released, contacts K1–11 cause a ground condition to be applied via resistor 18 to lead 30. When relay K1 is operated, a positive potential is applied to lead 30. Switch Conditions Indicator S2 translates this information into any usable form desired.

A high frequency switching unit embodied in a switching system has been described above. It is understood that any modifications therein within the skill of one in the art will not depart from the spirit or scope of the invention as claimed hereinafter.

What is claimed is:

1. A balanced electromechanical unit for selectively switching a common channel between first and second transmission channels, comprising first and second input transmission lines connected to said transmission channels, respectively, said first and second transmission lines having a particular characteristic impedance, a plurality of relays capable of being switched between a first and a second state and having a plurality of sets of operative contacts which exhibit capacitive reactance shunting said contacts whenever open at high frequencies, a load having said particular characteristic impedance, first means for connecting said first transmission line to a first and a second set of said contacts, second means for connecting said second transmission line to a third and fourth set of said contacts, third means for connecting said common channel in series with said first connecting means through said second set of contacts and in series with the second connecting means through said third set of said contacts, and fourth means for connecting said load in series with the first connecting means through the first set of contacts and in series with the second connecting means through the fourth set of said contacts, said relays maintaining said second and said fourth sets of contacts closed when in the first state, said relays maintaining said first and said third sets of contacts closed when in the second state, said second, third and fourth connecting means comprising short transmission lines having a greater characteristic impedance than said particular characteristic impedance to form with said capacitive reactance of said connected sets of contacts whenever open a low pass filter between said common channel and one of said first and second channels.

2. A device as defined in claim 1 and means to eliminate crosstalk comprising a plurality of nonoperative contacts exhibiting substantially the same capacitive reactance shunting said nonoperative contacts as said capacitive reactance shunting said operative contacts, a first set of said nonoperative contacts connected between said first and fourth sets of contacts, and a second set of nonoperative contacts connected between said second and third sets of contacts, said first set of nonoperative contacts bridging said first and fourth sets of contacts when said relays are in the first state, said second set of nonoperative contacts bridging said second and third sets of contacts when said relays are in the second state.

3. A device for selectively switching an output circuit between two input circuits, all of said circuits having a particular characteristic impedance, said device comprising relays capable of being switched between a first and second state and having a plurality of sets of contacts which exhibit capacitive reactance shunting said contacts whenever open at high frequencies, first means for connecting one of said input circuits to a first set of said contacts, second means for connecting the other input circuit to a second set of said contacts, and third means for connecting said output circuit in series with said first and second connecting means through said first and second sets of said contacts, said second and third connecting means comprising short transmission lines having a characteristic impedance greater than said particular characteristic impedance, the length of each of said transmission lines being determined by the capacitive effect of the set of contacts to which it is connected to provide a compensating inductance therefor, said relays closing said first set of contacts when in the first state, said relays closing said second set of contacts when in the second state.

References Cited by the Examiner

UNITED STATES PATENTS

| | | | |
|---|---|---|---|
| 2,229,108 | 1/41 | Maggio et al. | 340—147 |
| 2,412,161 | 12/46 | Patterson | 333—7 X |
| 2,438,017 | 3/48 | Murcek | 340—147 |
| 2,458,566 | 1/49 | Cox et al. | 333—7 X |
| 2,695,385 | 11/54 | Shunemann | 200—153 |
| 2,958,053 | 10/60 | Concelman | 200—153 |
| 2,958,054 | 10/60 | Concelman | 200—153 |
| 2,992,363 | 7/61 | Granqvist | 340—147 |
| 3,035,169 | 5/62 | Griffith | 333—3 |
| 3,111,624 | 11/63 | Farkas | 340—147 |

HERMAN KARL SAALBACH, *Primary Examiner.*

STEPHEN W. CAPELLI, *Examiner.*